April 20, 1965     F. KUHRT ET AL     3,179,856
MAGNETO-ELECTRIC SIGNAL TRANSMITTER
Filed Aug. 29, 1962     2 Sheets-Sheet 1

3,179,856
MAGNETO-ELECTRIC SIGNAL
TRANSMITTER
Friedrich Kuhrt and Hans-Joachim Lippmann, Nurnberg, Germany, assignors to Siemens-Schuckertwerke Aktiengesellschaft, Berlin-Siemensstadt, Germany, a corporation of Germany
Filed Aug. 29, 1962, Ser. No. 220,337
Claims priority, application Germany, Sept. 5, 1961, S 75,584
4 Claims. (Cl. 317—157)

Our invention relates to magnetically responsive transmitters which issue pulses of signal voltage in response to proximity of a magnetic or magnetizable object. In a more particular aspect, the invention relates to an improvement of magneto-electric signal transmitters of the type disclosed in our copending application Serial No. 120,781, filed June 29, 1961, and assigned to the assignee of the present invention.

Our invention is described hereinbelow with reference to the accompanying drawings in which.

Magneto-electric signal transmitters of the type here involved, particularly as illustrated and described in our above-mentioned copending application Serial No. 120,-781, are applicable as proximity-responsive position indicators or switches, such as limit switches in hoisting, conveying or distributing devices, machine-control systems, registering and counting apparatus, for example. Such a signal transmitter comprises an iron circuit with two mutually counteracting magnets and a magnetizable yoke member, as well as a Hall-voltage generator whose Hall plate is disposed between respective pole shoes of the two magnets. Within the ferromagnetic circuit formed by the two magnets and the interconnecting yoke with the Hall plate, the magnetic flux is partially or substantially entirely compensated when the transmitter is in idle condition. That is, the differential flux passing through the Hall plate is equal to zero or negligibly small as long as the transmitter is not subjected to the effect of a magnetic or magnetizable object in its vicinity. However, when a ferromagnetic object is passed through the vicinity of such a signal transmitter, the just-mentioned flux compensation with respect to the Hall plate is disturbed or eliminated, so that the change in Hall voltage issuing from the Hall generator furnishes a pulse indicative of the motion and position of the object.

Figure 1:
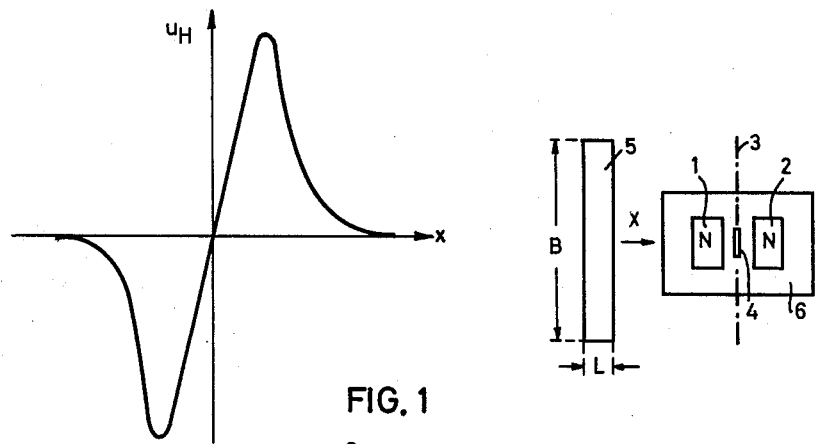
FIGS. 1 and 2 are explanatory, each showing diagrammatically a transmitter system and a corresponding graph of position-responsive voltage in accordance with the above-mentioned application Serial No. 120,781.

FIG. 1 schematically represents the arrangement and performance of such a signal transmitter, illustrating only the essential components of the apparatus, it being understood that in other respects the transmitter is similar to that shown in the aforesaid copending application, or shown in FIGS. 4 and 5 of the present disclosure with the exception of the additional improvement features according to the invention, described and explained further below.

According to FIG. 1, the Hall plate 4 of a Hall-voltage generator is disposed between the pole faces of two magnets 1, 2 which have poles of the same polarity magnetically joined with a yoke plate 6 of soft-magnetic material, i.e. a magnetizable material of high magnetic permeability. An object 5, for example an iron structure, passes in the direction $x$ over the signal transmitter without necessarily touching any structural part of the transmitter. As the object passes by the transmitter, the Hall-voltage generator generates a Hall voltage $u_H$, as typically represented by the voltage curve in the graph of FIG. 1, where this voltage is plotted over the travel distance in the $x$-direction. When the object 5 is located exactly above the Hall plate so that the center axis of the object coincides with the axis 3 of the Hall plate, the Hall voltage $u_H$ is equal to zero. In any other proximity position of the object 5, the Hall voltage is either positive or negative depending upon whether the object is located ahead of the Hall plate 4 or behind the plate. Consequently, the signal transmitter furnishes a voltage pulse indicative of the direction of travel and is also capable of producing an exact positional signal at the moment of the zero passage.

Figure 2:
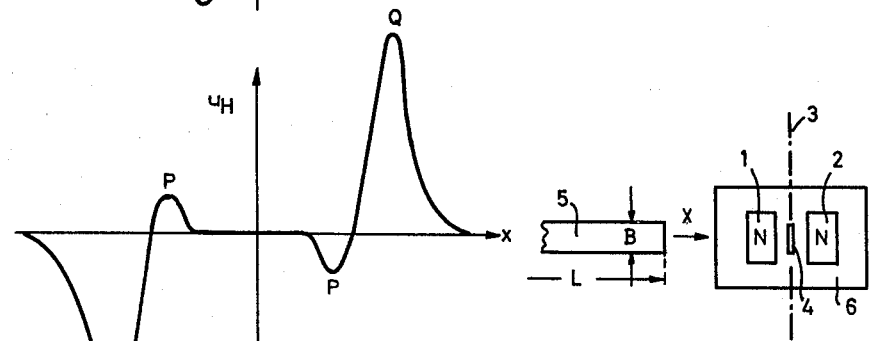

It has been found, however, that the illustrated course of the Hall voltage is obtained only if the length L of the object in the travel direction $x$ is relatively small, for example only if the ratio of width B to length L is considerably greater than unity, as is the case with the object shown in FIG. 1; but if the object is elongated in the direction of travel, such operating conditions as typified in FIG. 2 will obtain. Under the latter conditions, an exact zero passage of the voltage at a singular point of travel is no longer achieved. There result two subsidiary maxima, such as shown at P, in addition to the main maxima Q. The amplitude of the subsidiary maxima P varies relative to that of the main maxima Q in dependence upon the distance between the iron object 5 and the surface of the signal transmitter. Aside from the fact that now a precise positional signal is no longer produced, there also occur difficulties when employing bistable electric trigger circuits for utilizing the Hall voltage, because now the trigger circuits may be inadvertently triggered by the subsidiary maxima.

Objects 5 of the type represented in FIG. 2 occur, for example, in rolling mills where these objects are represented by the workpieces being rolled and are intended to release proximity or limit switches in response to the magneto-electric signal transmission. For example, if the leading front face of an elongated rod of iron being fabricated in a rolling mill is to effect such release, the subsidiary maxima may cause a double releasing operation.

It is an object of our invention to eliminate such deficiencies of the above-mentioned magneto-electric signal transmitters and to enforce under all circumstances of operation a definite, singular zero passage of the signal voltage without subsidiary maxima.

To this end, and in accordance with a feature of our invention, we provide the magnetizable yoke, in a transmitter of the described type, with an extended portion and mount on this portion another magnet beside the active magnetic circuit proper, the added magnet being located, in the traveling direction of the object to be responded to, beside one of the two magnets of the main magnetic circuit and having the same magnetic orientation as the latter magnet.

As a result, and as will be explained presently, the signal voltage generated in response to proximity of an object, has a definite zero passage regardless of the length of the object. Although the added magnet, if no further change is made, modifies the flux distribution, a substantial flux compensation with respect to the Hall plate can be obtained in the idle condition of the transmitter by somewhat displacing the Hall plate and the adjacent pole shoes relative to the geometrical symmetry axis of the transmitter and mounting the Hall plate in the magnetic symmetry axis of the three-magnet arrangement.

Figure 3:
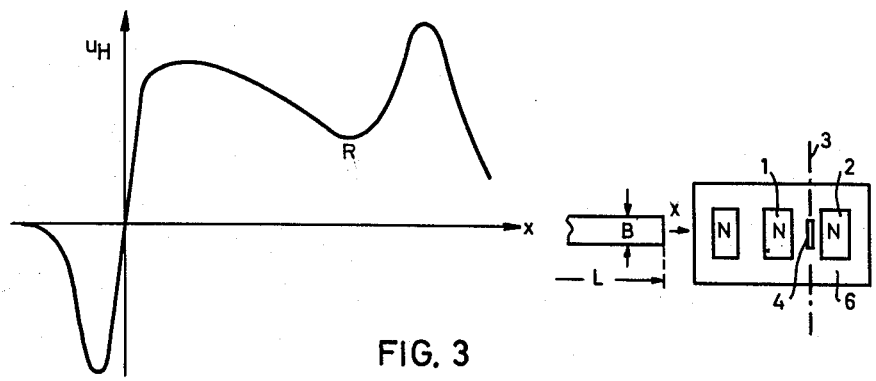
FIG. 3 is another explanatory representation of the same type but relates to a transmitter system according to the present invention.

The performance thus achieved by virtue of the invention is represented diagrammatically in FIG. 3, where corresponding elements are denoted by the same reference characters as in FIGS. 1 and 2. As indicated by a measured voltage-travel curve, there occurs a distortion of the voltage characteristic with respect to the Hall-voltage plotted over the travel path $x$, but a singular zero passage at a given point of the travel path is nevertheless attained so that an accurate positional response is secured, and a double indication is reliably prevented.

The invention will be further described with reference to the embodiment exemplified by FIGS. 4, 5 and 6.

Mounted on a carrier plate 6 of iron or the like magnetizable material are two permanent magnets 1 and 2. Respective magnet poles of the same polarity, here the south poles, are joined with the yoke plate 6. Placed upon the other poles are respective pole plates 7 and 8 of soft-magnetic (high permeability) material. The pole plates 7 and 8 are provided with respective pole shoes 9 and 10, for example of high-permeability ferrite, which form a narrow pole-face gap between each other which is filled by the Hall plate 4 of a Hall-generator system. The Hall plate may consist of indium antimonide (InSb) or indium arsenide (InAs) and is preferably given rectangular shape as apparent from FIG. 6. Located along the two short sides of the rectangle are respective current supply electrodes by means of which an energizing current is passed through the plate during operation of the signal transmitter. Located on the two long sides of the rectangular plate are respective probe electrodes (Hall electrodes) which have the same electric potential as long as the Hall plate is not traversed by magnetic flux. When the Hall plate is subjected to a magnetic field, however, the two probe electrodes assume respectively different potentials so that a Hall voltage is generated between them, the polarity of this voltage being dependent upon the direction of the flux passing through the plane of the Hall plate.

Figure 4:
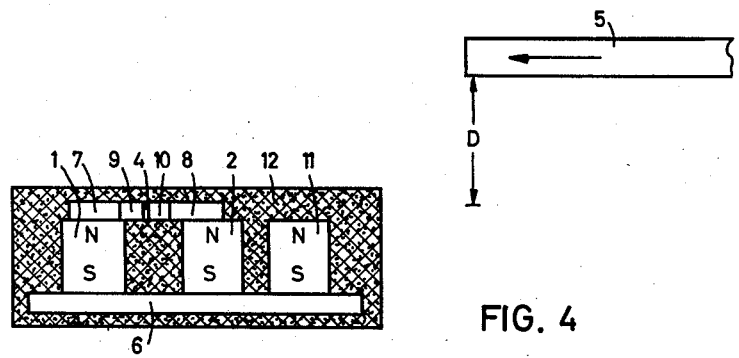
FIG. 4 is a lateral view of a signal transmitter embodying the invention by way of example.
Figure 5:
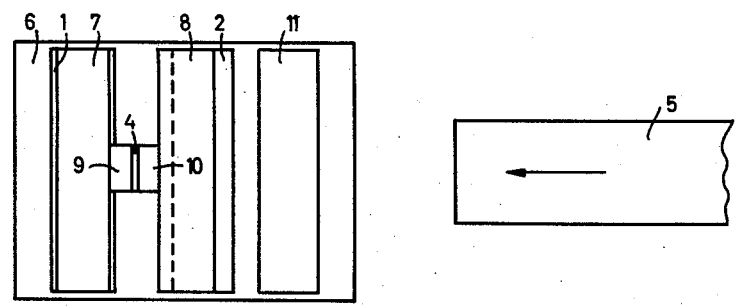
FIG. 5 is a plan view of the same transmitter, also showing, like FIG. 4, the relative position of the magnetizable object suitable for causing the transmitter to issue a voltage pulse.

According to the invention, the yoke plate 6 as shown in FIGS. 4 and 5 is extended toward the right beyond the magnet 2, and a third magnet 11 is mounted on the plate in magnetic parallel relation to the magnet 2 and with the same magnetic orientation. The entire signal transmitter is preferably embedded in a mass of casting resin 12 or the like in order to increase its mechanical stability.

When the object 5 in form of an elongated rod or rail of iron is passed over the signal transmitter at a given distance D, which may amount up to about 5 cm., a Hall voltage as typified by the curve in FIG. 3 is obtained. The formation of subsidiary maxima is prevented by the magnet 11 which renders secondary magnetization in the object 5 ineffective.

Figure 6:
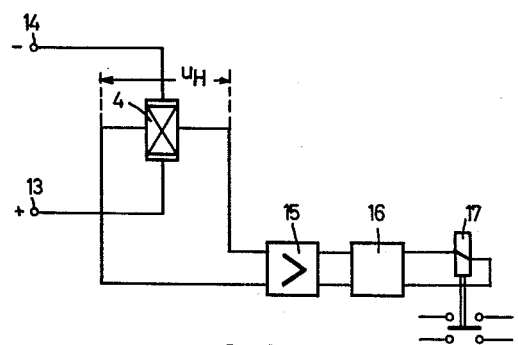
FIG. 6 is a schematic electric circuit diagram of a signal transmitter according to the invention.

The energizing current which passes through the Hall plate 4 during operation of the device is supplied through terminals 13 and 14 according to FIG. 6. This current may consist of a constant direct current. The Hall electrodes and corresponding output leads of the Hall plate 4 are connected through an amplifier 15 to a bi-stable trigger stage 16 which comprises a polarized relay 17 for the control of electric circuits.

It will be understood that transmitters according to the invention can be modified to a great extent as compared with the embodinmet described in the foregoing. Particularly the internal design of the magnetic iron circuit may be modified as long as care is taken that the magnetic flux is wholly or partially compensated at the location of the Hall plate when the transmitter is idle, i.e., not subjected to the influence of a magnetizable object. In this respect reference may again be had to FIG. 3. It will be realized from this illustration that the signal transmitter is also capable of operating satisfactorily if a finite Hall voltage amplitude occurs in the idle condition, as long as this idling voltage remains appreciably smaller than the minimum at R of the voltage curve, so that only one intersection with the abscissa is obtained.

Upon a study of this disclosure, such and other modifications will be obvious to those skilled in the art and are indicative of the fact that our invention can be given embodiments other than particularly mentioned herein, without departing from the essential features of our invention and within the scope of the claims annexed hereto.

We claim:

1. Magneto-electric signal transmitter comprising a ferromagnetic circuit having a soft-magnetic yoke member and two magnets joined with said yoke member in mutually opposed polarity relation, and a Hall-voltage generator having a Hall plate interposed in said ferromagnetic circuit at a place of said member intermediate said magnets so as to be normally subjected to respective fluxes from said magnets whereby said generator issues a pulse of signal voltage in response to proximity of a ferromagnetic object, said yoke member having a portion extending beyond one of said magnets, and a third magnet joined with said extended portion of said yoke member beside said circuit and poled in the same sense as the adjacent one of said other two magnets.

2. A magneto-electric signal apparatus comprising a ferromagnetic object having a given path of motion, a magnetic circuit device having a magnetizable yoke member and two permanent magnets joined with said yoke member in mutually opposed polarity relation, said two magnets being spaced from each other in a direction substantially parallel to said path, a Hall-voltage generator having a Hall plate interposed in said yoke member between said two magnets to be normally subjected to mutually differential fluxes from said respective magnets whereby said generator issues a voltage pulse in response to proximity of said object, said yoke member having a portion extending beyond one of said magnets in said direction, and a third magnet joined with said extended portion in magnetic parallel relation and the same polarity as the adjacent one of the other magnets, whereby said voltage pulse passes through zero magnitude when said object is at a singular point of said path regardless of the length which said object has in said direction.

3. In a signal transmitter according to claim 1, said Hall plate being located in the over-all magnetic symmetry axis of said magnetic circuit device.

4. In a signal transmitter according to claim 1, said three magnets being permanent magnets of the same type, said two magnets of said magnetic circuit being provided with respective soft-magnteic pole shoes opposite each other, and said Hall plate being disposed between said pole shoes in face-to-face relation thereto.

References Cited by the Examiner
UNITED STATES PATENTS

| 3,041,416 | 6/62 | Kuhrt | 324—45 |
| 3,080,550 | 3/63 | Kuhrt | 324—45 X |

FOREIGN PATENTS 359,462  2/62  Switzerland.

SAMUEL BERNSTEIN, *Primary Examiner.*